United States Patent [19]

Wenger et al.

[11] Patent Number: 5,429,835
[45] Date of Patent: Jul. 4, 1995

[54] FRIED SNACK PRODUCT AND METHOD OF PREPARING SAME

[75] Inventors: Marc L. Wenger, Sabetha; Jeffrey C. Herbster, Morrill, both of Kans.

[73] Assignee: Wenger Manufacturing, Inc., Sabetha, Kans.

[21] Appl. No.: 979,373

[22] Filed: Nov. 19, 1992

Related U.S. Application Data

[63] Continuation of Ser. No. 811,952, Dec. 23, 1991, abandoned, which is a continuation-in-part of Ser. No. 803,637, Dec. 5, 1991, abandoned.

[51] Int. Cl.$^6$ .............................. A23L 1/6; A23L 1/18
[52] U.S. Cl. ................................... 426/557; 426/439; 426/440; 426/559; 426/808
[58] Field of Search ............... 426/557, 439, 440, 559, 426/808

[56] References Cited

U.S. PATENT DOCUMENTS

| | | |
|---|---|---|
| Re. 31,819 | 1/1985 | Weiss et al. . |
| 1,750,645 | 3/1930 | Offenhauser . |
| 2,570,864 | 10/1951 | Rowlson . |
| 3,297,450 | 1/1967 | Loska, Jr. . |
| 3,353,962 | 11/1967 | Smith, Jr. . |
| 3,458,321 | 7/1969 | Reinhart et al. . |
| 3,486,904 | 12/1969 | Ziegler . |
| 3,539,356 | 11/1970 | Benson et al. . |
| 3,575,382 | 4/1971 | Loomans . |
| 3,615,724 | 10/1971 | Sech . |
| 3,698,914 | 10/1972 | Kortschof et al. . |
| 3,698,915 | 10/1972 | Glasgow . |
| 3,703,379 | 11/1972 | Cummisford et al. . |
| 3,745,019 | 7/1973 | Huxsoll et al. . |
| 3,812,274 | 5/1974 | Weaver et al. . |
| 3,817,496 | 6/1974 | Kratochvil et al. . |
| 3,873,070 | 3/1975 | Beken et al. . |
| 3,925,563 | 12/1975 | Straughn et al. . |
| 3,997,684 | 12/1976 | Willard . |
| 4,073,013 | 2/1978 | Blach . |
| 4,126,706 | 11/1978 | Hilton . |
| 4,166,139 | 8/1979 | Ishida ................................. 426/557 |
| 4,185,125 | 1/1980 | Sakakibara et al. ................. 426/557 |
| 4,394,397 | 7/1983 | Lometillo et al. . |
| 4,419,375 | 12/1983 | Willard et al. . |
| 4,511,583 | 4/1985 | Olson et al. . |
| 4,529,609 | 7/1985 | Gaehring et al. .................... 426/557 |
| 4,563,358 | 1/1986 | Mercer et al. . |
| 4,623,548 | 11/1986 | Willard . |
| 4,623,550 | 11/1986 | Willard . |
| 4,650,687 | 3/1987 | Willard et al. . |
| 4,744,669 | 5/1988 | Kowalczyk et al. . |
| 4,769,253 | 9/1988 | Willard . |
| 4,770,891 | 9/1988 | Willard . |
| 4,834,996 | 5/1969 | Fazzolare et al. . |
| 4,931,303 | 6/1990 | Holm et al. . |
| 4,970,084 | 11/1990 | Pirrotta et al. . |
| 5,059,439 | 10/1991 | Wenger et al. ...................... 426/557 |
| 5,128,166 | 7/1992 | Babines et al. ...................... 426/557 |
| 5,165,950 | 11/1992 | Boehmer et al. .................... 426/446 |

OTHER PUBLICATIONS

Huber, et al.; Expansion Extrusion and Normal Extrusion Snacks, (no date).
Rokey, et al.; Extrusion Cooking For Production of Corn Based Snacks; Jul., 1987.

*Primary Examiner*—Jeanette Hunter
*Assistant Examiner*—Mary S. Mims
*Attorney, Agent, or Firm*—Hovey, Williams, Timmons & Collins

[57] ABSTRACT

An improved fried snack product is provided which is fabricated by a two step process including initial extrusion followed by frying, preferably in a wet condition wherein the extrudate has a moisture content of from about 16–40% by weight. The starting mixture fed to the extruder preferably includes an amount of low protein flour (e.g., cake flour) in order to increase the expansion of the product upon frying. Fried snacks in accordance with the invention exhibit a smooth, even appearance, and have excellent organoleptic properties. Extrusion is advantageously carried out using an initial preconditioner and a co-rotating twin screw extruder equipped with a venting apparatus along the length thereof.

17 Claims, 1 Drawing Sheet

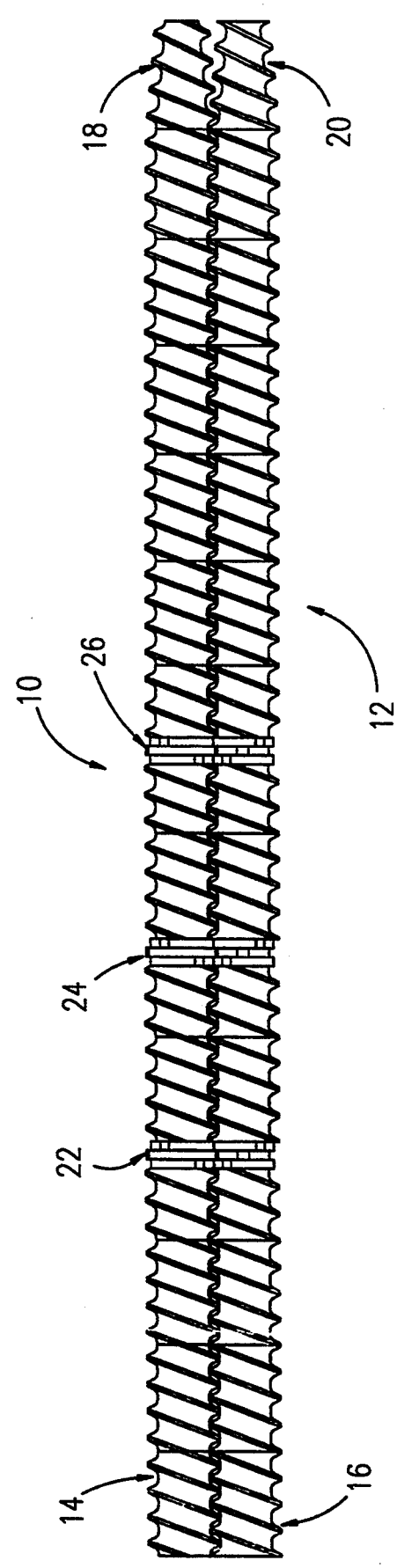

FRIED SNACK PRODUCT AND METHOD OF PREPARING SAME

This is a continuation of application Ser. No. 07/811,952 filed Dec. 23, 1991, now abandoned, which is in turn a continuation-in-part of application Ser. No. 07/803,637 filed Dec. 5, 1991, now abandoned.

BACKGROUND OF THE INVENTION

1. Field of the Invention

The present invention is broadly concerned with improved fried snack products, as well as a method of fabricating such snacks. More particularly, it is concerned with snacks which have improved appearance and organoleptic characteristics by fabrication using initial low-temperature extrusion followed by frying while the extruded products are relatively wet, e.g., at a moisture level of from about 16–40% by weight. In another aspect of the invention, use of low protein flour, and especially cake flour, in the snack mixture gives improved, expanded products. Such low protein flours may be used exclusively, or in combination with pasta-type flours such as Durum or Semolina.

2. Description of the Prior Art

It is known that desirable snack products can be produced via a two-stage process wherein a starting flour/water mixture typically including pasta flour (e.g., Durum or Semolina) is first extruded, followed by drying of the extrudate and frying. As a class, these snacks are known as "third generation" products, and are characterized by an expanded, crunchy texture and mouth feel.

U.S. Pat. No. 5,059,439 describes a very successful process for the low temperature extrusion of pasta products to produce instant or quick-cooking pastas. In the preferred process, a starting pasta flour/water mixture is first preconditioned and then passed through a co-rotating twin screw extruder having a vent in the barrel thereof. Processing temperatures and retention times are controlled in the extruder, so that the final product is largely or completely cooked upon emerging from the extruder. Thereafter, the extrudate is dried to a moisture content of about 10–12% by weight. In use, the pasta products can be readily rehydrated and exhibit very desirable eating qualities.

The step of frying the dried, quick-cooking pasta product, although an obvious expedient in light of third generation snack technology, tends to yield a product which is characterized by irregular blistering on the surface thereof and minimal expansion. Therefore, while the extrusion fabrication of quick-cooking pasta and pasta-type products is known, as well as the advantages of such products, frying of these extrudates has not produced first-quality snack products.

SUMMARY OF THE INVENTION

The present invention overcomes the problems outlined above, and provides greatly improved fried snack products which have an even surface of desirable color, as well as the other organoleptic properties required for consumer acceptance. In addition, the products can be fabricated so as to achieve limited or substantial expansion upon frying, at the desire of the processor.

Broadly speaking, the method involves first forming a mixture or dough comprising flour and water, and passing the mixture into and through an extruder to form at least a partially cooked extrudate. Thereafter, and very importantly, the extrudate is fried in a relatively wet condition, i.e., the extrudate at the point of frying should have a moisture content of from about 16–40% by weight (moisture content, wet basis), and more preferably from about 20–30% by weight.

In another aspect of the invention, it has been found that use of a low protein flour such as cake four in the starting flour mixture provides a very desirable degree of expansion in the final fried product. Such low protein flours should have a protein content of up to about 11% by weight, and more preferably from about 1–9% by weight. The low protein flour can be used alone as the sole flour constituent or can be mixed in combination with other flours, and especially pasta-type flours. In such cases, the low protein flour is generally present at a level of from about 1–50% by weight of the total dry ingredients mixture, and more preferably from about 1–5% by weight.

BRIEF DESCRIPTION OF THE DRAWINGS

The single FIGURE is an essentially schematic, plan view illustrating the preferred twin screw extruder configuration used in the extrusion fabrication step of the invention.

DETAILED DESCRIPTION OF THE PREFERRED EMBODIMENTS

As indicated previously, an important feature of the invention resides in the discovery that an improved fried snack product may be fabricated by first forming a mixture or dough including flour and water, followed by extrusion of this mixture and frying of the extrudate in a relatively wet condition. Broadly, the preferred extrusion process of the invention closely follows that described in U.S. Pat. No. 5,059,439, which is incorporated by reference herein.

In particular, the apparatus employed preferably comprises a Wenger TX Model twin screw extruder as well as a Wenger DDC preconditioner. Both of these components are commercialized by Wenger Manufacturing, Inc. of Sabetha, Kans. The preconditioner is fully described in U.S. Pat. No. 4,752,139 also incorporated herein, and includes a elongated conditioning vessel having transversely arcuate walls presenting a pair of interconnected chambers, with one chamber having a greater cross-sectional area than the adjacent chamber. A mixing shaft is located within each chamber and includes outwardly extending mixing paddles thereon. The shafts are rotated at different rotational speeds respectively during operation. The extruder is illustrated and described in U.S. Pat. No. 4,875,847, also incorporated herein, and is characterized by a pair of co-rotating, intermeshing screws having a pair of conical screws adjacent the output end of the extruder.

The single FIGURE illustrates the preferred screw configuration found to be particularly useful in the context of the present invention. To this end, the extruder apparatus is equipped with co-rotating screws 10, 12 having respective inlet sections 14, 16 and conical nose screws 18, 20. In addition, shearlock sets 22, 24 and 26 are interposed along the length of the screws to increase mixing and residence time, and to generate transient pressure points in the extruder. Screw rotation will normally range from about 100–400 rpm. Those skilled in the art will of course appreciate that the screws 10, 12 are housed within an elongated, sectionalized barrel which is commonly provided with external jackets for introduction of indirect heating or cooling media. Moreover, a die is situated adjacent the ends of the nose screws 18, 20. A conventional pasta die may be used in this context to achieve the desired product shape and size.

The preferred extruder of the invention is also equipped with a venting assembly which serves to remove moisture from the material passing through the barrel. Such a venting assembly is specifically illustrated in the aforementioned U.S. Pat. No. 5,059,439. The venting assembly includes structure defining an aperture in one of the housing heads, along with a stuffer apparatus designed to prevent loss of material from the barrel and to draw a vacuum so as to assist in the venting operation.

In operation, the dry ingredients, namely flour and optional materials such as salt and surfactant are directed to the DDC preconditioner, whereupon moisture, in the form of water and/or steam, is added to the dry ingredients. In the preconditioner, a uniform mixture is created through the rotation of the mixing shafts. In particular, the mixture is subjected to a maximum temperature of from about 150°–230° F., and more preferably from about 190°–212° F., in the preconditioner; the residence time of the mixture in the preconditioner ranges from about 20 seconds to 6 minutes, more preferably from about 1–3 minutes. Preferably, steam is injected during travel of the mixture along the first one-third of the length of the preconditioner. The material exiting the preconditioner preferably has a moisture content of from about 20–50% by weight, and more preferably from about 25–45% by weight. Moreover, by virtue of the preconditioning treatment, the mixture is at least partially precooked therein.

Material leaving the preconditioner is fed directly to the inlet of the twin screw extruder. In the extruder, the mixture is subjected to a maximum temperature of up to about 240° F. and preferably up to about 220° F. In terms of ranges, the maximum temperature should be from about 150°–240° F. Desirably, the mixture is subjected to two stages of treatment in the extruder, namely a cooking stage and a downstream forming stage. The material is subjected to the highest temperature it will experience in the extruder in the cooking stage, whereas the temperatures experienced in the forming stage are generally below the maximum temperature of the cooking stage. Thus, while the cooking stage temperatures may range from 150°–240° F., preferably about 190°–220° F., those of the forming stage are generally lower, on the order of 130°–220° F., more preferably from about 150°–210° F.

The total residence time of the mixture in the extruder will typically be in the range of from about 30 seconds to 2 minutes, while more preferred residence times would be from about 10–25 seconds in the cooking region and from about 20–80 seconds in the forming region.

If venting is used, the vent apparatus should be situated between the cooking and forming regions. Most preferably, the venting apparatus is of the type described in U.S. Pat. No. 5,059,439, and a vacuum level of from about 5–20 in. Hg should be employed.

Maximum pressures within the extruder should be in the range of from about 200–1500 psig, more preferably from about 200–1000 psig. Normally, maximum pressures are achieved in the final extrusion head, just upstream of the die.

As the extrudate emerges from the extrusion die, it is cut by means of a rotary knife or similar expedient.

Although not critical, the extrudate should have a total length of from about ⅜" to 2", more preferably from about ½ to 1¼".

As explained, in one aspect of the invention, it is important that the extrudate not be substantially dried as is typical in the production of pastas. Rather, the extrudate should be maintained in a relatively wet condition for frying purposes. To this end, the extrudate may be immediately fried, or can be subjected to a cooling operation using ambient temperature air. This will have the effect of somewhat reducing the total moisture content of the extrudate, but it would still have a moisture level in excess of typical pasta production, of course, drying/cooling conditions are variable depending upon desired final product characteristics. Finally, if desired, the extrudate may be partially dried and/or allowed to equilibrate by sitting undisturbed for a number of hours before frying.

Frying conditions are completely conventional, and involve placing the extrudate in cooking oil having a temperature of from about 350°–400° F. for a period of from about 5–45 seconds. These conditions are variable, depending upon the qualities desired in the final product.

The final products after frying are essentially free of uneven blisters and exhibit a smooth, appealing outer surface and a characteristic fried color (the final color depends upon fryer temperature and retention time).

It has also been discovered that the final product quality of pasta-type snacks containing Durum or Semolina flour can be materially affected by the inclusion of certain ingredients other than pasta flour and water. For example, use may be made of minor amounts of surfactant and salt, with the surfactant being present at a level of from about 0.5–5% by weight. Salt may be used at normal percentages, typically from about 1–4% by weight. Desirably, the salt employed should be in flour form, as opposed to dendretic or flake form.

Most importantly, however, it has been discovered that use of low protein flour provides the most pronounced organoleptic improvement in the final fried product, especially in lighter density expanded products. Although a variety of low protein flours may be used, cake flour is the most preferred. Acceptable snacks can be fabricated using low protein or cake flour alone, but best results are obtained when such flours are mixed with pasta-type flours, most notably Durum or Semolina. In such cases, the low protein flour may be used at a level of from about 1–99% by weight, more preferably from about 1–50% by weight, and most preferably at a level of from about 1–5% by weight. The single most preferred products in accordance with the invention include about 1.5% by weight cake flour. The low protein flour ingredient enhances the expansion of the snack product upon frying, and is also believed to contribute to the even frying and characteristics of the snacks of the invention. Such is particularly true when use is made of optional ingredients such as baking soda or baking powder.

Cake flour is understood by those skilled in the art to be of a particular kind and quality, and is described in *Wheat Chemistry and Technology*, 1971 Edition, and edited by Y. Pomerantz, pp. 221 and 223; this information is incorporated by reference herein. Thus, cake flour is normally spring or winter wheat having a low flour absorption (farinograph) of from about 40–55, an ash content of from about 0.20–0.45, an alkaline water retention of from about 50–65, a white color, an average Fisher particle size of from about 8-12 microns, a protein content of from about 5-8.5%, and a MacMichael viscosity of from about 35°-60°. Suitable cake flour may be obtained from ConAgra, Inc., namely its Pinnacle or American Beauty cake flours.

The following examples describe the preferred fabrication techniques and products in accordance with the invention. It is to be understood that the examples are presented by way of illustration only and nothing therein should be deemed a limitation upon the overall scope of the invention.

EXAMPLE I

In this series of runs, a Wenger TX-138 twin screw extruder was employed, having a Wenger DDC preconditioner and a barrel made up of eight interconnected, jacketed heads with the fifth head being equipped with a vent/vacuum port and a stuffer-type venting device of the type described in U.S. Pat. No. 5,059,439. The output end of the extruder barrel was equipped with a three-vane rotini die (Model R36296 sold by Maldari Bros. of New York, N.Y.). The screw configuration of the TX-138 machine is illustrated in the drawing FIGURE.

The following formulae were used in this series of runs:

(1)

Durum Flour—94.25% by weight
Cake Flour—1.5% by weight
Myvaplex 600—0.75% by weight
Salt Flour—3.5% by weight (2)

Durum Flour—99.25% by weight
Myvaplex 600—0.75% by weight (3)

Durum Flour—94.25% by weight
Cake Flour—1.5% by weight
Baking Soda—0.5% by weight
Myvaplex 600—0.75% by weight
Dendretic Salt—3.0% by weight The extrusion conditions employed for these runs are set forth in the following table:

TABLE 1

|  |  | RUN #1 | RUN #2 | RUN #3 | RUN #4 |
|---|---|---|---|---|---|
| Raw Material Rate | PPH | 3000 | 2870 | 2870 | 2870 |
| Feed Screw Speed | RPM | 180 | 285 | 285 | 285 |
| Steam Flow to Preconditioner | PPH | 270 | 250 | 250 | 250 |
| Water Flow to Preconditioner | PPH | 400 | 400 | 400 | 400 |
| Preconditioner Temperature | °F. | 200 | 195 | 195 | 195 |
| EXTRUSION INFORMATION: |  |  |  |  |  |
| Extruder Shaft Speed | RPM | 160 | 160 | 160 | 160 |
| Motor Load | % | 60 | 56 | 56 | 56 |
| Steam Flow to Extruder | PPH | 200 | 200 | 200 | 200 |
| Water Flow to Extruder | PPH | 600 | 600 | 600 | 600 |
| Control/Temperature-2nd Head | °F. | 171 | 175 | 175 | 175 |
| Control/Temperature-3rd Head | °F. | 241 | 240 | 240 | 240 |
| Control/Temperature-4th Head | °F. | 210 | 212 | 212 | 212 |
| Control/Temperature-5th Head | °F. | Vent | Vent | Vent | Vent |
| Control/Temperature-6th Head | °F. | 152 | 155 | 155 | 155 |
| Control/Temperature-7th Head | °F. | 190 | 190 | 190 | 190 |
| Control/Temperature-8th Head | °F. | 190 | 190 | 190 | 190 |
| Head/Pressure | PSIG | 8/900 | 8/900 | 8/900 | 8/900 |
| Head/Pressure | PSIG | 7/500 | 7/500 | 7/500 | 7/500 |
| FINAL PRODUCT INFORMATION: |  |  |  |  |  |
| Extrudate Moisture |  | 33.2 |  |  |  |
| Formula Number |  | (1) | (2) | (2) | (3) |

In the case of Run #1, a total of 1,600 pounds of extrudate was produced. This extrudate was pneumatically conveyed to the inlet of a two-pass dryer equipped with an airlock. At the airlock, the moisture content of the product was about 31.7% by weight, and a sample of this product was saved for frying. In the dryer, ambient temperature air was used, in order to cool the product and effect a measure of drying thereof. After the two-pass treatment (15 minutes each pass), the moisture content of the cooled product was about 19.5% by weight. This product was then divided into totes, four of which were loaded into a conventional truck, with four being loaded into a refrigerated truck. The product was shipped to a frying location, and was fried approximately 16 hours after extrusion.

The fried products were excellent, and exhibited small even blistering. The products derived from the cooling were considered the best.

In the case of Runs #2 and #3, the formula did not contain cake flour. However, the product was fried wet, specifically at a moisture level of about 27% by weight. These samples were obtained at the dryer airlock as described above.

The Run #4 extrudate was cooled in the two-pass dryer using ambient air and retention times of 30 minutes in each drying stage to achieve a final moisture content of about 19.5% by weight. The temperature recorded in the dryer during the cooling process was 180° F.

EXAMPLE II

In this example, a starting mixture made up of 99.25% by weight cake flour (General Mills) and 0.75% by weight Myvaplex surfactant was used. The equipment used was a Wenger DDC preconditioner with a nine head Wenger Model TX 52 extruder very similar to that described previously. The extruder was vented between the 6th and seventh heads, using the apparatus described above. The final die was a 0.025" elbow die (Maldari Bros. #46868).

The extrusion conditions recorded in this run are set forth below.

TABLE 2

| | | RUN #1 |
|---|---|---|
| PRECONDITIONING INFORMATION: | | |
| Feed Screw Speed | RPM | 15 |
| Mixing Cylinder Speed | RPM | 110 |
| Steam Flow to Preconditioner | PPM | 0.38 |
| Water Flow to Preconditioner | PPM | 0.459 |
| Mixing Cylinder Temperature | °F. | 208 |
| Moisture Entering Extruder | MCWB | 29.79 |
| EXTRUSION INFORMATION: | | |
| Extruder Shaft Speed | RPM | 160 |
| Motor Load | % | 32 |
| Steam Flow to Extruder | PPM | 0.513 |
| Water Flow to Extruder | PPM | 0.159 |
| Control/Temperature-2nd Head | °F. | CW/118 |
| Control/Temperature-3rd Head | °F. | CW/118 |
| Control/Temperature-4th Head | °F. | HO/230 |
| Control/Temperature-5th Head | °F. | HO/230 |
| Control/Temperature-6th Head | °F. | HO/230 |
| Control/Temperature-7th Head | °F. | CW/194 |
| Control/Temperature-8th Head | °F. | CW/194 |
| Control/Temperature-9th Head | °F. | CW/196 |
| Head/Pressure | PSIG | 9/1100 |
| Head/Pressure | PSIG | DIE/600 |

The extrudate emerging from the extruder had a moisture content of 30.41% by weight, and was thereupon dried to a moisture content of 7.47% by weight. The drying sequence involved use of 160° F. air, with retention times in the first pass, second pass and cooler being 5.9, 21.0 and 10.5 minutes respectively.

The dried extrudate was then fried and exhibited a substantial degree of expansion. A control was also produced wherein the starting material was conventional pasta flour (Durum). This control when fried was compared with the cake flour extrudate. It was found that the straight cake flour extrudate of this example gave approximately twice the degree of expansion, as compared with the control. The cake flour extrudate furthermore exhibited a pleasing appearance and good organoleptic properties.

We claim:

1. In a method for fabricating a fried snack product including the steps of forming and preconditioning a mixture of flour and water for a period of about 20 seconds to 6 minutes and subjecting the mixture to elevated temperature to a maximum of from about 150°-230° F., and passing the preconditioned mixture into and through an extruder and forming at least a partially cooked extrudate, said extrusion step comprising the steps of introducing said preconditioning mixture into the barrel of an extruder equipped with a flighted, rotatable screw and an extrusion die, rotating the screw to sequentially advance the preconditioned mixture along the length of the barrel first through a cooking zone, then through a venting zone and a forming zone, and finally through said extrusion die, said mixture having a maximum temperature of up to about 240° F. in said cooking zone, and thereafter frying the partially cooked extrudate, the improvement which comprises incorporating into said mixture a quantity of a low protein wheat flour having a protein content of from about 1-9% by weight.

2. The method of claim 1, said mixture comprising from about 20-50% by weight water.

3. The method of claim 2, said mixture comprising from about 25-45% by weight water.

4. The method of claim 1, including the step of injecting steam into said preconditioner during formation of said mixture.

5. The method of claim 1, wherein said mixture is subjected to two stages of treatment in said extruder, first in a cooking region wherein the highest temperature is below about 240° F., and second in a forming region wherein the temperature is less than the maximum temperature of the mixture in said cooking region.

6. The method of claim 5, including the steps of retaining said mixture in said cooking region for a period of from about 10-25 seconds, and retaining said mixture in said forming region for period of from about 20-80 seconds.

7. The method of claim 5, including the step of subjecting the mixture to venting between said cooking region and said forming region.

8. The method of claim 1, wherein said mixture is subjected to a pressure of from about 200-1500 psig in said extruder.

9. The method of claim 1, wherein said mixture has a residence time of from about 30 seconds to about 2 minutes in said extruder.

10. The method of claim 1, including the step of cooling said extrudate prior to frying thereof.

11. The method of claim 1, said frying step comprising placing said extrudate in cooking oil having a temperature of from about 350°-400° F. for a period of from about 5-45 seconds.

12. The method of claim 1, said low protein flour being the sole flour constituent of said mixture.

13. The method of claim 1, said mixture including respective quantities of a pasta-type flour and said low protein flour.

14. The method of claim 13, said low protein flour being present at a level of from about 1-50% by weight.

15. The method of claim 14, said low protein flour being present at a level of from about 1-5% by weight.

16. The method of claim 1, said low protein flour comprising cake flour.

17. A fried snack product made in accordance with the method of claim 1.

* * * * *